Figure 1:
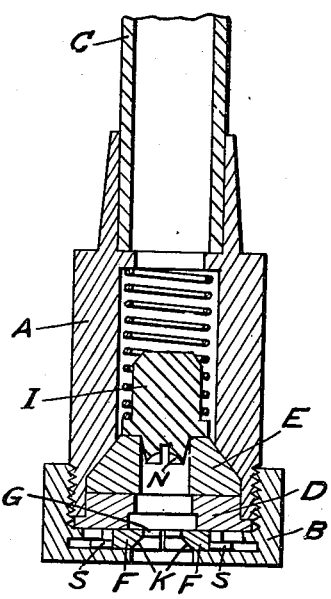
Figure 2:
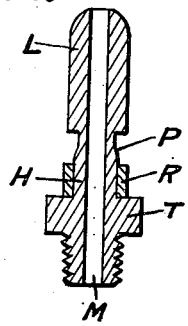
Figure 3:
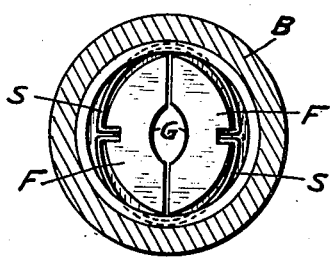
Figure 4:
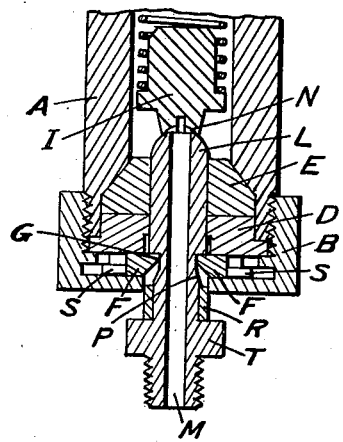
Figure 5:
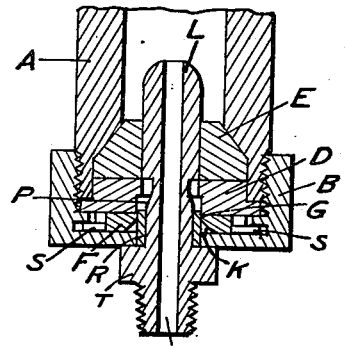
Figure 6:
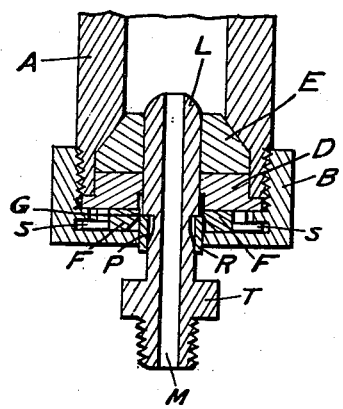

W. C. IFTIGER.
COUPLING.
APPLICATION FILED JULY 30, 1919.

1,383,209.

Patented June 28, 1921.

INVENTOR
WILLIAM CARL IFTIGER
BY
Hazard & Miller
ATT'YS.

UNITED STATES PATENT OFFICE.

WILLIAM CARL IFTIGER, OF WATTS, CALIFORNIA.

COUPLING.

1,383,209.    Specification of Letters Patent.    Patented June 28, 1921.

Application filed July 30, 1919. Serial No. 314,344.

*To all whom it may concern:*

Be it known that I, WILLIAM CARL IFTIGER, a citizen of the United States, residing at Watts, in the county of Los Angeles and State of California, have invented new and useful Improvements in Couplings, of which the following is a specification.

My invention is an improved coupling, which may be used for coupling hose or for other purposes.

My coupling may be quickly connected or disconnected, and it includes means for effectively preventing the separation of its members under the influence of high pressure of the fluid passing through it.

Referring to the annexed drawing which forms a part of this specification:

Figure I is a longitudinal section of the female member of my coupling.

Fig. II is a longitudinal section of the male member of my coupling.

Fig. III is an inside view of the cap of the female member, and the spring locking jaws in said cap.

Fig. IV is a longitudinal section of the coupling with the male member introduced partly into the female member of the coupling and the members coupled together.

Fig. V is a longitudinal section of my coupling with the male member introduced all the way into the female member and the locking jaws spread by the ring of the male member to permit the male member to be withdrawn from the female member.

Fig. VI is a longitudinal section of my coupling with the male member in the act of being withdrawn from the female member.

My coupling includes a femal coupling member illustrated separately in Fig. I and a male coupling member illustrated separately in Fig. II.

The female coupling member includes a tubular casing A, one end of which is recessed to provide means for attaching it to a hose or other conduit C, and its other end is externally threaded to receive an internally threaded cap B having a central opening therein coinciding with the axis of the coupling, in which cap a pair of semi-circular jaws F, F are mounted to move transversely thereof and to close over the center of said cap opening at the axis of the coupling under the influence of closing springs S, S, as shown in Fig. III. The jaws F have gripping edges G about one-thirtysecond of an inch wide and opposing outer inclined faces K inclined from said gripping edges.

The circular member D (having a central opening of two dimensions to properly accommodate the nipple when in position as shown in Fig. V) in conjunction with the end wall of the cap B forms a housing for the jaws F F and the springs S S, said member D thereby also assists to incage the circular member E (made of elastic material, such as rubber, etc.) which member E is conical in form and centrally pierced for the purpose of tightly engaging the head L of the male coupling member, thereby preventing leakage during the passage of liquid through the coupling. Said members E and D, the jaws F F and the springs S S, are all assembled by the means of the cap B, in a manner as shown in Fig. I.

I is a spring actuated circular check valve, in which the lower blunt pointed extremity N is cupped for the purpose of engaging the convex point of the male coupling member efficiently, as shown in Fig. IV. Said extremity N is further transversely slotted to form a channel to communicate with the central opening M in the nipple, see Fig. IV. Said check valve I may be omitted when certain liquids are introduced through the coupling.

In the male member Fig. II, having a central opening M throughout, L is the head, P is an annular groove, the forward side of which extends 90° to the axis of the member and forms a shoulder while its rear side is inclined outwardly and rearwardly.

The part H of the nipple carries a loosely fitted annular sleeve R, the travel of which is confined between the forward side or shoulder of groove P and an annular flange T on the rear part of the male member, by reason of said shoulder and said flange being diametrically larger than the inner diameter of the sleeve R.

In operating the interlocking mechanism, the head L of the male member is made to enter the female member by way of the central opening in the cap B, such entry being continued until the jaws F F which are engaged and spread apart by the head L have fully engaged the annular groove P, as shown in Fig. IV, providing thereby a secure and continuous conductor for the liquid.

To separate the male and female members it is necessary to further enter the male member nipple to its maximum, which includes the entrance of the sleeve R in the central opening of the cap B, as shown in Fig. V, by which operation the jaws F F are forced to withdraw from the annular groove P by reason of the engagement of the inclined side of said groove P with said jaws; and the jaws are further forced apart by the engagement of the annular sleeve R with the beveled outer edges K K of the jaws, leaving thereby the male member proper free to be withdrawn from the female member; in which operation the forward side or shoulder of the groove P engages the upper end of the sleeve R and closes the annular groove P, see Fig. VI, said closing of the groove P by the sleeve R (the diameter of which sleeve slightly exceeds that of the head L of the nipple) prevents the jaws from springing into the groove and locking the coupling members, the width of the gripping edges G preventing said edges from wedging the jaws in between the forward side of the groove P and the inner end of the sleeve R, thereby allowing the nipple to be withdrawn without hindrance, the forward side of groove P engaging and withdrawing the sleeve.

All operations pertaining to locking and unlocking the mechanism are of momentary duration.

I claim as my invention:

1. A coupling including a male member and a female member, means for locking the male member partly within the female member against withdrawal from the female member, and means for holding said locking means out of operation upon axially introducing said male member farther into said female member to withdraw axially said male member from said female member.

2. A coupling including two tubular coupling members, a pair of transversely movable jaws in one member, springs for normally holding said jaws together, the outer edges of said jaws and the inner end of said other coupling member being inclined to cause said jaws to move apart when engaged by said inner end of said other member to admit said other member between said jaws into the first member, said second coupling member being provided with a groove into which said jaws spring when said second member is inserted into said first member, the forward side of said groove forming a shoulder for engaging said jaws to prevent said second member from being withdrawn from said first coupling member, the opposite side of said groove being inclined outwardly to permit said second member to be inserted farther in said first member to spread said jaws until said groove passes said jaws, a flange on said second coupling member, a sleeve surrounding said second member normally rearwardly beyond said groove and in engagement with said flange, said sleeve being adapted to engage and hold said jaws apart when the second member is inserted farther into the first member until said flange engages the outer end of said first member, and said sleeve being adapted to hold said jaws apart until said groove passes from between the jaws and said shoulder engages said sleeve in withdrawing said second member and said sleeve from said first member.

3. A coupling including a male member, a female member, said female member including a tubular casing the inner end of which having an internal conical surface, a cap screwing on one end of said casing, provided with a central opening in its head, a pair of spring jaws slidably mounted in said cap to close over said opening, an apertured member fitting in and engaging said cap over said jaws, a conical apertured elastic member the base of which resting against said apertured member and its conical surface engaging the internal conical surface of said casing, said male member including means engaged by said jaws when it is inserted part way through said cap opening, jaws, and apertured members to prevent withdrawal of the male member from the female member, and means, when the male member is inserted farther into the female member, to unlock said jaws from the male member to permit the male member to be withdrawn from the female member.

4. A coupling including a male member and a female member, means for locking the male member partly within the female member against withdrawal from the female member, means for holding said locking means out of operation upon introducing said male member farther into said female member to withdraw said male member from said female member, and means for limiting the introduction of said male member into said female member.

5. A coupling including a male member and a female member, an end wall on said female member provided with an opening to receive said male member, a pair of spring jaws in said female member closing over said opening, said male member being provided with a groove into which said jaws are adapted to spring when said male member is introduced through said opening part way into said female member to prevent withdrawal of said male member from said female member, a sleeve on said male member normally behind said groove, the forward end of said sleeve being adapted to rest closely within said opening when said jaws are in said groove, means for limiting the rear movement of said sleeve on said male member, the rear side of said groove being inclined to force said jaws apart to disengage said groove when the male member is introduced farther into said female member, said jaws being beveled at its outer edges to be engaged and spread by the forward end of said sleeve when the male member is inserted farther into the female member, and said sleeve being adapted to hold said jaws spread and close said groove until the forward end of the groove is drawn into engagement with the forward end of said sleeve and said groove is withdrawn outwardly past the jaws in withdrawing the male member from the female member.

6. A coupling including a female member and a male member, an end wall on said female member provided with an opening, a pair of spring jaws in said female member, said male member being provided with an annular groove into which said jaws spring when the male member is introduced partly into said female member to lock said male member against withdrawal from said female member, and means for spreading said jaws out of said groove when the male member is introduced farther into said female member to withdraw said male member from said female member.

7. A coupling including a female member and a male member, an end wall on said female member provided with an opening, a pair of spring jaws in said female member, said male member being provided with an annular groove into which said jaws spring when the male member is introduced partly into said female member to lock said male member against withdrawal from said female member, the rear side of said groove being inclined to engage and spread said jaws out of said groove when the male member is inserted farther into said female member, the male member being reduced slightly in diameter for a short distance rearwardly of said groove, a flange at the rear end of said reduced portion, a sleeve surrounding said reduced portion of said male member and slidable thereon, said sleeve being adapted to close said groove and spread said jaws when said male member is inserted farther into said female member to permit said male member to be withdrawn from said female member, the forward side of said groove engaging and withdrawing said sleeve when the male member is withdrawn from the female member.

8. A coupling including a male member and a female member, an end wall on said female member provided with an opening to receive said male member, a pair of spring jaws in said female member closing over said opening, said male member being provided with a groove into which said jaws are adapted to spring when said male member is introduced through said opening part way into said female member to prevent withdrawal of said male member from said female member, a sleeve on said male member normally behind said groove, the forward end of said sleeve being adapted to rest closely within said opening when said jaws are in said groove, means for limiting the rear movement of said sleeve on said male member, the rear side of said groove being inclined to force said jaws apart to disengage said groove when the male member is introduced farther into said female member, said jaws being beveled at their outer edges to be engaged and spread by the forward end of said sleeve when the male member is inserted farther into the female member and said sleeve being adapted to hold said jaws spread and close said groove until the forward end of the groove is drawn into engagement with the forward end of said sleeve and said groove is withdrawn outwardly past the jaws in withdrawing the male member from the female member, said jaws having gripping edges of a thickness sufficient to prevent the jaws from wedging into the groove between the forward side thereof and the inner end of said sleeve when the male member is withdrawn from the female member.

WILLIAM CARL IFTIGER.